United States Patent
Nakajima et al.

(10) Patent No.: US 8,519,305 B2
(45) Date of Patent: Aug. 27, 2013

(54) POLYMER HEATING ELEMENT

(75) Inventors: Keizo Nakajima, Shiga (JP); Akihiro Umeda, Shiga (JP); Takahito Ishii, Kyoto (JP); Katsuhiko Uno, Shiga (JP); Hiroshi Fukuda, Shiga (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 12/867,862

(22) PCT Filed: Feb. 4, 2009

(86) PCT No.: PCT/JP2009/000434
§ 371 (c)(1),
(2), (4) Date: Aug. 16, 2010

(87) PCT Pub. No.: WO2009/104361
PCT Pub. Date: Aug. 27, 2009

(65) Prior Publication Data
US 2010/0326976 A1    Dec. 30, 2010

(30) Foreign Application Priority Data

Feb. 18, 2008 (JP) ............................... P2008-035583
Oct. 16, 2008 (JP) ............................... P2008-267014
Dec. 12, 2008 (JP) ............................... P2008-316382

(51) Int. Cl.
*H05B 1/00*    (2006.01)

(52) U.S. Cl.
USPC ........................................................ 219/217

(58) Field of Classification Search
USPC ................... 219/217, 180.12, 504, 505, 209, 219/542, 549
See application file for complete search history.

(56) References Cited

U.S. PATENT DOCUMENTS

| 7,049,559 B2 | 5/2006 | Ishii et al. |
| 2004/0238516 A1 | 12/2004 | Bulgajewski |
| 2009/0051196 A1* | 2/2009 | Ishii et al. ................. 297/180.12 |

FOREIGN PATENT DOCUMENTS

| CN | 1717126 A | | 1/2006 |
| JP | H01-186782 | | 7/1989 |
| JP | 07057550 A | * | 3/1995 |
| JP | 2002075052 A | * | 3/2002 |
| JP | 2002-371699 | | 12/2002 |
| WO | WO 2007/110976 | | 10/2007 |

OTHER PUBLICATIONS

"Advantages of flame retardants based on nitrogen compounds" by Horacek et al. Polymer Degradation and Stability 54 (1996) 205-215.*
International Search Report dated Apr. 28, 2009 for PCT/JP2009/000434, 1 page.

* cited by examiner

*Primary Examiner* — Marcos D. Pizarro
*Assistant Examiner* — Sue Tang
(74) *Attorney, Agent, or Firm* — Brinks Hofer Gilson & Lione

(57) ABSTRACT

A polymer heating element includes an electrically insulating base substrate, at least a pair of electrodes made of a plurality of thin metal wires formed on the electrically insulating base substrate, a polymer resistor which is not in direct contact with the pair of electrodes and which has PTC characteristics, and conductive layers which are in contact with both the electrodes and the polymer resistor. The conductive layers include at least a resin component, a conductor component and an additive component.

20 Claims, 6 Drawing Sheets

POLYMER HEATING ELEMENT

This is a 371 application of PCT/JP2009/000434 having an international filing date of Feb. 4, 2009, which claims priority to JP2008-035583 filed on Feb. 18, 2008, JP2008-267014 filed on Oct. 16, 2008 and JP2008-316382 filed on Dec. 12, 2008, the entire contents of which are incorporated herein by reference.

TECHNICAL FIELD

The present invention relates to a polymer heating element which utilizes Joule heat of a polymer resistor and, more particularly, to a polymer heating element which has long-term reliability and can also be produced at low cost.

BACKGROUND ART

Conventionally, a substance obtained by dispersing conductive substances such as carbon black, metal powder and graphite into a resin is known for a heating portion of a planar heating element.

Among other things, when a PTC (abbreviation for an English term, Positive Temperature Coefficient which means positive temperature resistance characteristics) heating element which exhibits a self-temperature control function by combining conductive substances with a resin is used, no temperature control circuit is needed, thereby reducing the number of components. Thus, such the heating element is known as an advantageous device.

As shown in FIGS. 7 and 8, on a base substrate 101 having a function as a casing structure such as ceramics and an electrically insulated metal plate, an electrode 102 obtained by printing or coating a conductive ink composition and a resistor 103 obtained by printing or coating a resistor ink composition at a position to which electricity is supplied are provided, thereby forming a heating element 104. FIG. 7 is a plan view of a heating element, and FIG. 8 is a cross-sectional view taken along line X-Y in FIG. 7.

Conventional examples in which a polymer resistor is formed by printing and is used as a heating element include an automobile door mirror for removing dew and frost, a mirror of a washing stand, a floor heating system, etc. (for example, see Patent Document 1).

Patent Document 1: JP-A-2002-371699

Problems to be Solved by the Invention

In the above-described conventional configuration, a resistor composition to be used is usually 1000 $\Omega \cdot cm$ or more in specific electrical resistance. Therefore, the conventional configuration is required to supply electricity in very close proximity, such as a comb-shaped electrode. Further, normally, a comb-shaped electrode is formed by printing and drying silver paste. Therefore, its consumption quantity has increased to result in a higher price.

In a heating element prepared by using a polymer resistor as ink, a heating portion can be formed in a film form with several dozen micrometers by adjusting a coating quantity. Thus, it can easily exhibit flexibility as a polymer heating element. However, as a surface on which an ink-like polymer resistor is coated, the use of an electrically insulating base substrate is required such as a polyester film which is smooth, free from impregnation and also resilient, which results in a loss of flexibility. Further, as an electricity supplying portion of the polymer heating element, it is necessary to use an expensive conductive paste in a great quantity as a comb-shaped electrode. Thus, a drawback of higher cost is imposed.

On the other hand, a resistor to be used in extrusion molding is thicker in millimeters than that to be used in ink, lacks flexibility, and configured such that a spacing between electrode cables is in close proximity, which is far from a planar heating element. Thin molding methods such as T-die extrusion and calendering are available. However, there has been so far proposed no polymer resistor which is suitable for these methods.

SUMMARY OF THE INVENTION

In view of the above-described conventional technical problems, an object of the present invention is to provide a low-resistance polymer resistor which can be formed thin, thereby providing a polymer heating element in which the usability and reliability of a planar heating element are enhanced while reducing the cost.

Means For Solving the Problems

In a first aspect, a polymer heating element of the present invention for solving the above-described problems includes: an electrically insulating base substrate; at least a pair of electrodes formed on the electrically insulating base substrate and made of a plurality of thin metal wires; a polymer resistor which is not in direct contact with the pair of electrodes and which has PTC characteristics; and a conductive layer which is in contact with both the electrodes and the polymer resistor, wherein the conductive layer contains at least a resin component, a conductor component and an additive component.

In a second aspect, a polymer heating element of the present invention includes: an electrically insulating base substrate; at least a pair of electrodes formed on the electrically insulating base substrate and made of a plurality of thin metal wires; a polymer resistor which is not in direct contact with the pair of electrodes and which has PTC characteristics; and a conductive layer which is in contact with both the electrodes and the polymer resistor, wherein the conductive layer contains at least a cross-linking resin component and a conductor component.

In a third aspect, a polymer heating element of the present invention includes: an electrically insulating base substrate; a polymer resistor formed on the electrically insulating base substrate and having PTC characteristics; at least a pair of electrodes made of a plurality of thin metal wires which are not in direct contact with the polymer resistor; and a conductive layer which is in contact with both the polymer resistor and the electrodes, wherein the conductive layer exhibits PTC characteristics.

In the invention, basically, a polymer resistor exhibiting low resistance is formed on a thin film. According to the configuration, it is not necessary to have a comb-shaped configuration between the electrodes for supplying electricity to the resistor composition, thereby making it possible to form the electrodes at a wider spacing. Thereby, the electrodes are reduced in consumption quantity and the polymer resistor is not required to be patterned. Therefore, a cost-reduced planar heating element can be provided.

In the present invention, a conductive layer has primarily three roles.

That is, a first role is to improve the bending resistance by coating an electrode itself. We have already found that, as compared with a case where only an electrode is bent, a coated resin exhibits buffer-like effects, thereby improving the bending resistance characteristics.

Further, a second role is to improve firm bonding between an electrode portion and a polymer resistor portion via a conductive layer. Where a metal electrode is directly heat-sealed to a polymer resistor, depending on conditions at the time of compression bonding, the polymer resistor may crack. However, it is found that where a conductive layer is interposed therebetween, due to the presence of a resin component of the conductive layer, for example, an electrode is in advance coated with the conductive layer and subjected to extrusion molding, and the coated conductive electrode is fused and bonded to a polymer resistor, no cracks, etc., are generated, thereby obtaining favorable firm bonding and adhesion.

Still further, a third role is that even if an electrode portion made of metal wires is partially broken or in a state of being almost broken to cause a concentration of electric currents, as a conductive component of a conductive layer, a component different in composition from a polymer resistor, for example, a flame-retardant material such as an inorganic conductive material and a metal material is used, thus making it possible to exhibit barrier effects resulting in no smoking or ignition.

In the present invention, with attention given to these three roles, at the time of prolonged use, the supply of electric currents between an electrode portion and a polymer resistor portion is not prevented, thus making it possible to keep functions of the conductive layer.

In a second aspect of the present invention, particular attention is given to the above-described second role. In other words, it is required that a conductive layer does not easily thermally change or structurally change. As a result of giving consideration to various resin compositions, we have found that, as a resin component of the conductive layer, a composition containing a cross-linking resin component meets the above conditions, thereby making the present invention. A cross-linked resin is superior in structural stability and thermal stability of the resin to a resin which is not cross-linked and able to keep low resistance characteristics over a prolonged period which is one of the roles of the conductive layer.

In a third aspect of the present invention, we have found that a material composition of the conductive layer is selected from similar or relatively similar material compositions of the polymer resistor, by which the conductive layer is close to the polymer resistor in thermal change and structural change, thus making it possible to provide a configuration free from cracks and others at an interface portion over a prolonged period, thereby making the present invention. That is, a material composition of the conductive layer is also made of a material composition exhibiting PTC characteristics as with the polymer resistor, by which it is possible to achieve an object of the present invention.

As a substance exhibiting a function similar to that of the conductive layer, a conductive coating material is available. In the present invention, it is acceptable that an electrode and a conductive layer as well as a conductive layer and a polymer resistor are individually in a state of being adhered and firmly bonded, and whether an electrode itself is coated or not does not matter. As a result, an electrode portion may be in a state of being entirely coated by the conductive layer or may be in a state of being only partially coated.

Advantages of the Invention

According to the present invention, a planar heating element which is thin in film thickness and low in resistance can be provided, and the usability and reliability can also be enhanced, while promoting a reduction in cost.

Figure 1:
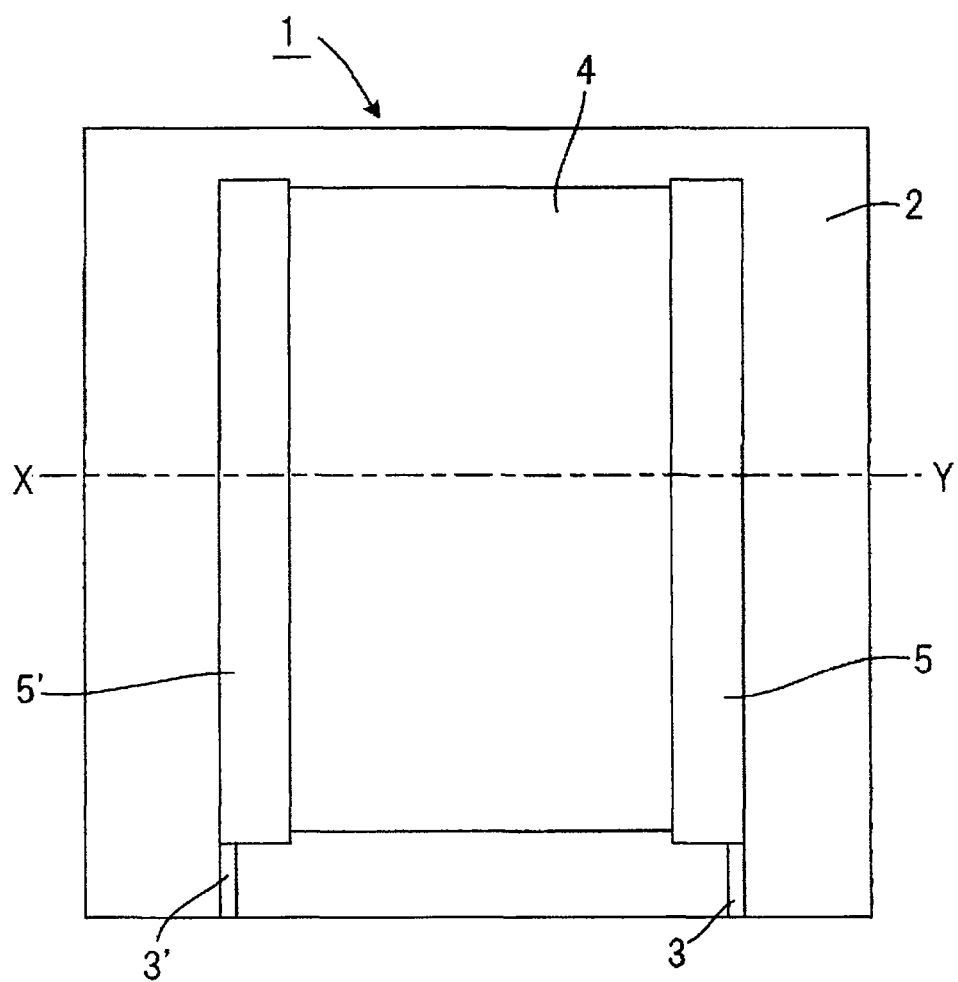
FIG. 1 is a plan view showing a configuration of a polymer heating element according to Embodiments 1 to 6 of the present invention.

DESCRIPTION OF REFERENCE CHARACTERS 1, 51, 61: polymer heating element
2, 52, 62: electrically insulating base substrate
3, 3', 53, 53', 63, 63': electrode
4, 54, 64: polymer resistor
5, 5', 55, 55', 65, 65': conductive layer
6: seat device
7: seat portion
8: seat back rest
9: seat base substrate
10: seat cover

DETAILED DESCRIPTION OF THE PREFERRED EMBODIMENTS

In a first invention, a polymer heating element includes: an electrically insulating base substrate; at least a pair of electrodes formed on the electrically insulating base substrate and made of a plurality of thin metal wires; a polymer resistor which is not in direct contact with the pair of electrodes and which has PTC characteristics; and a conductive layer which is in contact with both the electrodes and the polymer resistor, wherein the conductive layer contains at least a resin component, a conductor component and an additive component. Accordingly, it is not necessary to have a comb-shaped configuration between the electrodes for supplying electricity to the resistor composition, thereby making it possible to form the electrodes at a wider spacing. Thereby, the electrodes are reduced in consumption quantity and the polymer resistor is not required to be patterned. Therefore, a cost-reduced planar heating element can be provided.

Further, no complicated method is needed. The polymer resistor and conductive layers obtained, e.g., by a T die or a calender roll method are heat-sealed together with the electrodes to the electrically insulating base substrate, thereby easily attaining the fabrication.

Still further, the conductive layer provided between the electrodes made of a plurality of thin metal wires and the polymer resistor acts to cause firm bonding between the electrodes and the polymer resistor. Thus, as compared with a case where the thin metal wires are directly adhered to the polymer resistor, durability performance such as bending property can be enhanced.

In a second invention, in particular in the polymer heating element of the first invention, the resin component of the conductive layer has a functional group responsible for metal affinity. A contact state at an interface between the conductive layer and a metal acting as the electrode can be kept favorably, thus making it possible to easily obtain a heating element favorable in heating characteristics.

In a third invention, a polymer heating element includes: an electrically insulating base substrate; at least a pair of electrodes formed on the electrically insulating base substrate and made of a plurality of thin metal wires; a polymer resistor which is not in direct contact with the pair of electrodes and which has PTC characteristics; and a conductive layer which is in contact with both the electrodes and the polymer resistor, wherein the conductive layer contains at least a cross-linking resin component and a conductor component. Since the resin component of the conductive layer is made of the cross-linking resin component, it is possible to obtain a conductive layer which is excellent in thermal stability and small in change over a prolonged period. Further, the conductive layer provided between the electrodes made of a plurality of thin metal wires and the polymer resistor acts to cause firm bonding between the electrodes and the polymer resistor. Thus, as compared with a case where the thin metal wires are directly adhered to the polymer resistor, durability performance such as bending property can be enhanced.

In a fourth invention, in particular in the polymer heating element of the third invention, the conductive layer contains the cross-linking resin component, the conductor component and a melt tension improver component. Accordingly, at the time of kneading and dispersing the resin component and the conductor component, the conductor component and others can be enhanced in dispersing property and a molten resin can also be enhanced in tension. Consequently, it is possible to easily obtain a resin composition having desired components without reducing the molding property of the resin in terms of balance with the reactive cross-linking agent.

In a fifth invention, in particular in the polymer heating element of the third or the fourth invention, the cross-linking resin component of the conductive layer is cross-linked by a reactive additive agent. Consequently, cross-linking reactions can be accelerated while kneading and dispersing the resin component and the conductor component, thereby making it possible to produce a conductive layer composition by a technically simple and easy method.

In a sixth invention, in particular in the polymer heating element of the first or the third invention, the conductor component of the conductive layer is contained from 50% by weight or more and 80% by weight or less with respect to the weight of the conductive layer in terms of weight percentage.

Since a conductor is contained in the conductive layer at this weight percentage, even when an electrode made of thin metal wires is broken, the conductor component is present more than the resin component. Therefore, where a disconnection occurs to cause a concentration of electric currents, the development of spark can be suppressed. Further, the conductor component is contained at 80% by weight or less, by which the resin component and the additive component are contained at 20% by weight or more. Therefore, it is possible to keep the bending property and a certain degree of flexibility as the conductive layer.

In a seventh invention, in particular in the polymer heating element of any one of the first, third and sixth inventions, the conductor component of the conductive layer contains a conductor selected from at least one of carbon black, graphite, carbon nanotube, carbon fiber, conductive ceramic fiber, conductive whisker, metal fiber, conductive inorganic oxide and conductive polymer fiber. Since a raw material of the conductor can be obtained at a relatively low price and stably, it is possible to provide a polymer heating element which is higher in quality and low in cost.

In an eighth invention, in particular in the polymer heating element of the first invention, the additive component of the conductive layer contains at least one flame retardant selected from phosphorus, nitrogen and silicone-based flame retardants. Thereby, even when the polymer heating element is heated from the outside or when an electrode wire is disconnected to cause a local rise in temperature, a polymer heating element capable of suppressing smoking and ignition can be provided.

In a ninth invention, in particular in the polymer heating element of any one of the first to eighth inventions, the conductive layer is set to be 0.01 to 500 $\Omega \cdot cm$ in specific electrical resistance. Consequently, heating loss in the conductive layer is small, thereby making possible to produce an electrically stable polymer heating element.

In order to set a specific electrical resistance to less than 0.01 $\Omega \cdot cm$, it is required to increase the proportion of the conductor. However, in this case, since the proportion of the resin acting as a binder is reduced, firm bonding to metal is reduced. Further, when a specific electrical resistance becomes more than 500 $\Omega \cdot cm$, a resistance value of the conductive layer becomes greater than that of the polymer resistor upon application of a voltage. Thereby, only the conductive layer generates heat to result in failure of providing a planar heating element.

In a tenth invention, a polymer heating element includes: an electrically insulating base substrate; a polymer resistor formed on the electrically insulating base substrate and having PTC characteristics; at least a pair of electrodes made of a plurality of thin metal wires which are not in direct contact with the polymer resistor; and a conductive layer which is in contact with both the polymer resistor and the electrodes, wherein the conductive layer exhibits PTC characteristics. Accordingly, a conductive layer excellent in thermal stability and small in change over a long period can be provided. Further, the conductive layer provided between the electrodes made of a plurality of thin metal wires and the polymer resistor acts to cause firm bonding between the electrodes and the polymer resistor. Thus, as compared with a case where the thin metal wires are directly adhered to the polymer resistor, durability performance such as bending property can be enhanced.

In an eleventh invention, in particular in the polymer heating element of the tenth invention, a spacing between the polymer resistor and the electrode is in a range of 0.01 mm to 3 mm. The conductive layer existing therebetween acts as a cushioning material between the metal electrodes and the polymer resistor, and also will not cause a greater resistance on application of a voltage, thus allowing the polymer resistor to smoothly generate heat. When the spacing is narrower than 0.01 mm, depending on the method, the polymer resistor is in direct contact with metal as an electrode. Consequently, it is difficult to fully exhibit the above-described third role, that is, barrier effects on smoking and ignition. Further, when the spacing is greater than 3 mm, depending on specific electrical resistance of the conductive layer, heating loss in the conductive layer increases, and this is not favorable in terms of characteristics of the polymer resistor.

In a twelfth invention, in particular in the polymer heating element of the tenth invention, resistance value of the conductive layer at 80° C. is ten times or less than that at 20° C., in terms of PTC characteristics. The conductive layer is also configured by a material composition having PTC characteristics similar to the polymer resistor, thereby making it possible to improve mutual firm bonding and others. On the other hand, as PTC characteristics of the conductive layer itself, an increase in PTC change ratio in a high-temperature state may influence resistance value characteristics of the polymer resistor. Therefore, it is preferable to have PTC characteristics which are less than a certain ratio. In the present invention, in general, although at a relatively high level as a heat-generating temperature, even in a heat-generating state at about 80° C., it is preferable that the resistance value change ratio is ten times or less than that at 20° C. in terms of PTC characteristics.

In a thirteenth invention, in particular in the polymer heating element of any one of the tenth to twelfth inventions, a specific electrical resistance of the polymer resistor is 100 times or less than that of the conductive layer at a temperature of 80° C. or lower. Even when the specific electrical resistance of the polymer resistor is equal to that of the conductive layer, since a coated layer is narrow in spacing, the resistance value is considered to be about $1/1000$. Therefore, as long as the relationship of the resistance ratio defined in the present invention is kept, the resistance of the conductive layer will not hinder heat generation of the polymer resistor, thus making it possible to provide a favorable heating element.

In a fourteenth invention, in particular in the polymer heating element of the tenth to thirteenth inventions, the conductive layer is in parallel with the electrodes. Since the conductive layer is provided at a uniform thickness and width in a direction to which a voltage is applied, an approximately equal voltage is applied to the polymer heating element at any region. Thus, it is possible to provide a favorable heating element uniform in heat generation.

In a fifteenth invention, in particular in the polymer heating element of any one of the tenth to fourteenth inventions, a composition of the conductive layer and thin metal wires configuring the electrode are molded by co-extrusion. In advance, the conductive layer and the electrode are molded by extrusion, by which the electrode and the conductive layer can be improved in heat-sealing. The electrode having the thus prepared conductive layer can be molded as a heating element by heat-sealing or others with the polymer resistor. Thus, the heating element can be provided by a relatively simple method.

In a sixteenth invention, in particular in the polymer heating element of any one of the first, third and tenth inventions, the electrode is made of thin metal wires containing at least one of a tin plated copper, copper containing silver and silver-copper alloy. Since the electrode is excellent in flexibility and bending property, it is possible to provide a polymer heating element having favorable heating characteristics over a prolonged period.

In a seventeenth invention, in particular in the polymer heating element of any one of the first, third and tenth inventions, the electrically insulating base substrate is made of at least one of a resin film, fabric and non-woven fabric. Accordingly, it is possible to provide a polymer heating element excellent in usability and long-term reliability.

An eighteenth invention provides a seat device of an automobile on which the polymer heating element of any one of the first to seventeenth inventions which is mounted as a heat source for warming purposes and which is formed, for example, at least at one of a seat portion and a seat back rest portion.

Hereinafter, an explanation will be made for embodiments of the present invention with reference to the drawings. It is noted that these embodiments shall not limit the present invention.

(Embodiment 1)

Figure 2:
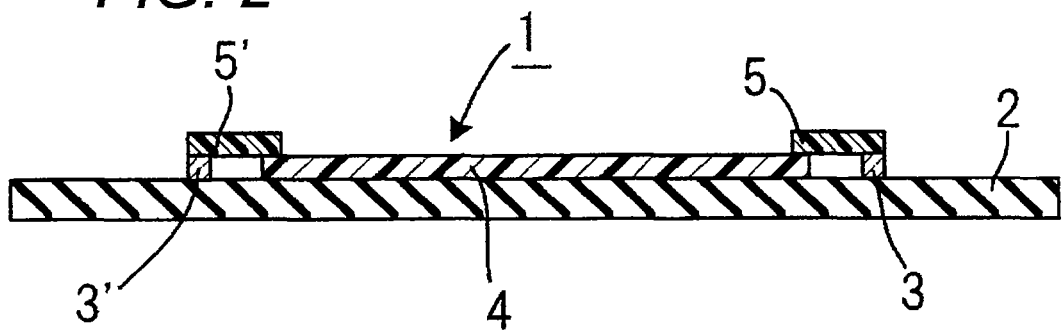
FIG. 2 is a cross-sectional view taken along line X-Y in FIG. 1.

In FIGS. 1 and 2, a polymer heating element 1 includes a pair of electrodes 3, 3', a polymer resistor 4 and conductive layers 5, 5' on an electrically insulating base substrate 2.

For example, the electrically insulating base substrate 2 is a needle-punched type prepared with polyester fibers. A flame retardant-impregnated non-woven fabric can be used.

The pair of electrodes 3, 3' are obtained by twisting 15 pieces of silver-copper alloy wires having a diameter of 0.06 mm and by heat-sealing at a predetermined position of the non-woven fabric.

The polymer resistor 4 was similarly formed by heat-sealing so as not to be in direct contact with the electrodes 3, 3'. Thereafter, the conductive layers 5, 5' for allowing the polymer resistor 4 to be in contact with the electrodes 3, 3' were formed by heat-sealing. It is noted that lead wires for supplying electricity to the electrodes 3, 3' are omitted.

At this time, the polymer resistor 4 was used in which a kneaded substance is prepared with the following materials in accordance with the following procedures, and thereafter processed into a film form by calendering.

That is, the polymer resistor 4 consisted of as a crystalline resin, 30 parts of an ethylene/methyl methacrylate copolymer (brand name of "Acryft CM5021," melting point of 67° C., produced by Sumitomo Chemical Co., Ltd.), 30 parts of an ethylene/methacrylic acid copolymer (brand name of "Nucrel N1560," melting point of 90° C., produced by DuPont-Mitsui Polychemicals Co., Ltd.), and 40 parts of an ethylene/methacrylic acid copolymer metal coordination compound (brand name of "Himilan 1702," melting point of 90° C., produced by DuPont-Mitsui Polychemicals Co., Ltd.).

35% by weight of this crystalline resin, 2% by weight of a reactive resin (brand name "Bondfast 7BJ," produced by Sumitomo Chemical Co., Ltd.), as two types of conductors, that is, 25% by weight of a carbon black (brand name of "Printex L," primary particle size of 21 nm, produced by Degussa AG), and 18% by weight of a graphite (brand name of "GR15," scaled graphite, produced by Nippon Graphite Industries Ltd.), and 20% by weight of a flame retardant (brand name of "Reophos RDP," a phosphate ester-based liquid flame retardant, produced by Ajinomoto Co., Inc.), were used to prepare a kneaded substance A.

Next, as an elastomer, 40% by weight of a styrene-based thermoplastic elastomer (brand name of "Tough-Tek M1943," produced by Asahi Kasei Engineering Corporation), 45% by weight of a carbon black (brand name "#10B," primary particle size of 75 nm, produced by Mitsubishi Chemical Corporation), 13% by weight of a tungsten carbide (produced by Izawa Metal Co., Ltd.), as a melt tension improver, 2% by weight of a mixture of an alkyl methacrylate/alkyl acrylate copolymer and a tetra-fluoroethylene copolymer (brand name of "Metablen A3000," produced by Mitsubishi Rayon Co., Ltd.), were used to prepare a kneaded substance B.

Then, the kneaded substance A and kneaded substance B in an equal quantity were kneaded with, as a release agent, 2% by weight of a modified silicone oil, and as a fluidity-imparting agent, 2% by weight of an alkyl methacrylate/alkyl acrylate copolymer to prepare a polymer resistor 4.

The conductive layers 5, 5' were obtained as follows: as a resin component, 21% by weight of an ethylene/vinyl acetate copolymer (brand name of "Evaflex EV 150," produced by DuPont-Mitsui Polychemicals Co., Ltd.), and as a functional group responsible for metal affinity, 9% by weight of a maleic anhydride-containing resin (brand name of "Bondine LX4110," an ethylene/acrylic ester/maleic anhydride ternary copolymer resin, produced by Sumitomo Chemical Co., Ltd.) were kneaded with, as a conductor, 45% by weight of a conductive whisker (brand name of "FTL-110," needle-like titanium oxide, produced by Ishihara Sangyo Kaisha, Ltd.), 15% by weight of a carbon black (brand name of "Printex L," primary particle size of 21 nm, produced by Degussa AG), and 10% by weight of a flame retardant (brand name of "Reophos RDP," a phosphate ester-based liquid flame retardant, produced by Ajinomoto Co., Inc.), thereby obtaining a kneaded substance, and a film with a thickness of 100 µm was prepared. The specific electrical resistance was 5 Ω·cm.

Figure 3:
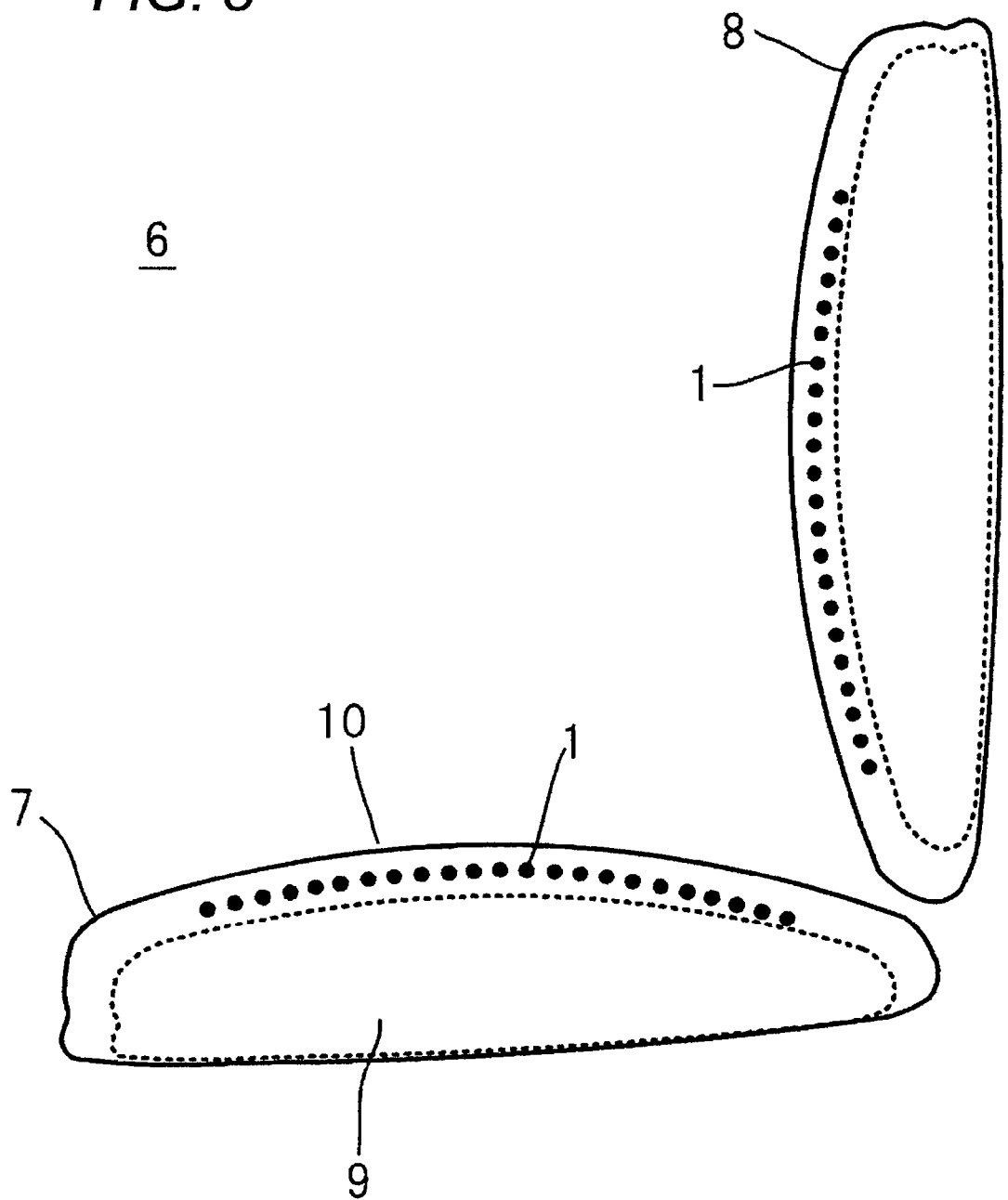
FIG. 3 is a perspective side elevational view showing seat devices of an automobile to which polymer heating elements according to Embodiments 1 to 8 of the present invention are attached.
Figure 4:
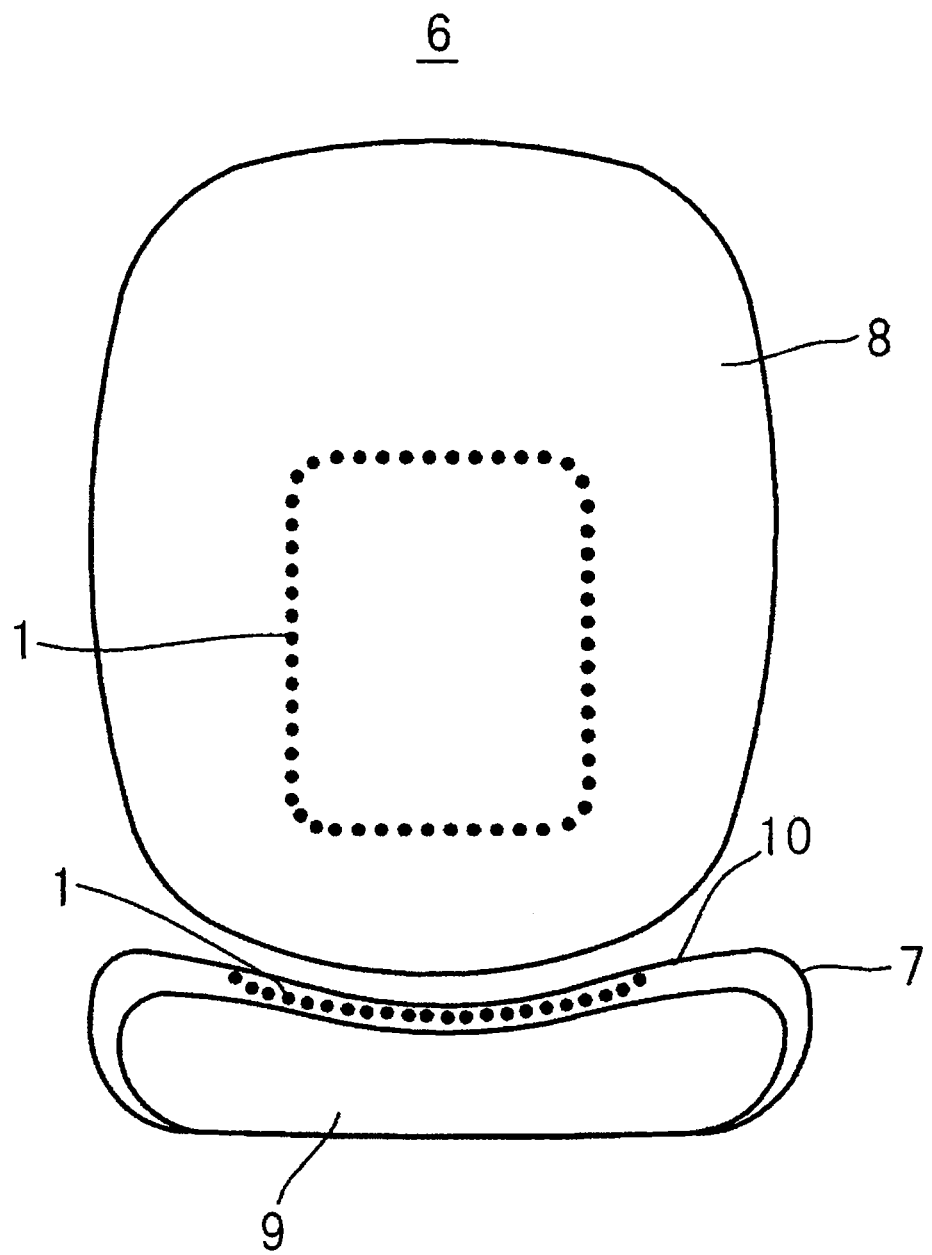
FIG. 4 is a perspective front view of a seat shown in FIG. 3.

The polymer heating element 1 which forms the planar heating element is, as shown in FIGS. 3 and 4, used for example by being attached to a seat portion 7 and a seat back rest 8 of the seat device 6 of an automobile, with the base substrate 2 being given as an upper part.

In order to respond to upholstered portions (not illustrated) of the seat portion 7 and the seat back rest 8, an ear portion (extended portion of the base substrate 2) is provided for upholstering them into a central portion and a peripheral border portion, which is, however, omitted here.

Further, the seat portion 7 and the seat back rest 8 on which the above-described polymer heating element 1 has been loaded are provided with a seat base substrate 9 and a seat cover 10 such as a urethane pad which is in general deformed when a load is applied by a person sitting on a seat and restored when a load is no longer applied. Therefore, the polymer heating element 1 which is a thin planar heating element attached by forming the polymer resistor 4 on the seat base substrate 9 of the seat portion 7 and the seat back rest 8, with the base substrate 2 formed on the seat cover 10, is also required to undergo similar deformation corresponding to the deformation of the seat portion 7 and the seat back rest 8.

Therefore, the design of various heat generating patterns and a configuration of forming the electrodes 3, 3' and the conductive layers 5, 5' are, as a matter of course, required to be changed, which are, however, omitted here.

The electrodes 3, 3' which are a wide pair (electrically positive and negative sides) are formed so as to oppose each other along the outside in the longitudinal direction of the polymer heating element 1. Electric currents flow through the polymer resistor 4 via the conductive layers 5, 5' formed so as to be in contact therewith, thereby generating heat.

In the present embodiment, the polymer resistor 4 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device 6 of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element.

The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 2 and, also, a flame retardant is blended into the polymer resistor 4 and conductive layers 5, 5', thus making it possible to realize flame retardance.

It was confirmed that the flame retardance is required to meet the FMVSS 302 standard for flame retardance of vehicle interior materials, as a single component of a polymer heating element (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element obtained in the present embodiment was subjected to a shelf test in a furnace at 80° C., a shelf test in a furnace at 150° C. and a heat cycle test at −20° C. and 50° C.

As a result, after the respective tests for 500 hours, 200 hours and at 200 times, the change ratios in resistance values were all within 30% of the initial value. This was considered due to the fact that a cross-linking reaction resulting from a reactive resin allowed bonding of a crystalline resin itself and bonding of the crystalline resin with a conductor.

In order to exhibit excellent PTC characteristics, a plurality of conductors are combined and a sea island structure is provided in the present embodiment. The details of the mechanism remain unknown at the present time, which are, however, estimated as follows.

First, in order to provide a resistor composition having PTC characteristics, it is necessary to select a crystalline resin to be used from those whose melting point is in the vicinity of a saturated heat generation temperature or more.

A conductor is required to attain a predetermined resistance value in an added quantity as little as possible. The conductor of this type is in general called conductive carbon black in which the primary particle size is about 20 nm or less and the structure is developed (which is an aggregate of primary particles like a bunch of grapes and correlated with an oil absorption). The above-described conductive carbon black is, on the other hand, disadvantageous in difficultly developing PTC characteristics.

This is said to be due to the fact that in the conductive carbon black, a structure is developed and a conductive path of the structure is not likely to be disconnected even by a change in specific volume due to the temperature of a crystalline resin (which is said to be mainly responsible for developing PTC characteristics).

On the other hand, the inventor and others have found that a carbon black greater in primary particle size has excellent PTC characteristics.

The inventor and others have also found that conductors such as graphite are greater in particle size than carbon black and provided with a scale-like layer structure and also conductors such as metals and ceramics are great in particle size and provided with amorphous excellent electrical conductivity (small in specific volume resistance (1/100 or less than carbon- and graphite-based conductors)). By combining a plurality of these conductors, a resistor composition can be provided in which the thickness is about 100 micrometers or less, the area resistance is 400 Ω/□ or less, the specific electrical resistance is 3 Ω·cm or less, and, in terms of the change ratio of resistance value with respect to a temperature which is one index of PTC characteristics, a ratio of resistance value at 50° C. to a resistance value at 20° C. is 1.5 or more and a ratio of resistance value at 80° C. to a resistance value at 20° C. is 5 or more.

Details of a mechanism capable of exhibiting excellent PTC characteristics although low in resistance remain unknown. It is, however, considered that this is because a new conductive path can be formed by combining a crystalline resin with a plurality of conductors and a great thermal expansion coefficient of liquid can be used by providing a liquid flame retardant.

Further, as a matter of course, plasticizers and dispersing agents such as wax like montanic acid moiety-saponified ester and other types of wax may be used whenever necessary.

Still further, the conductor used was in a whisker shape. A spherical shape or other bur-like shapes are also acceptable.

In addition, in the present embodiment, the polymer resistor 4 and the electrodes 3, 3' were shown in such an arrangement that they were not superimposed on the same plane. However, as long as they are in contact via the conductive layers 5, 5', a stacked arrangement is also acceptable.

(Embodiment 2)

A polymer heating element used in Embodiment 2 of the present invention was similar in structure to that used in Embodiment 1.

For example, the electrically insulating base substrate 2 was prepared with a polyester fiber and subjected to fine embossing. A flame retardant-impregnated non-woven fabric is usable.

The pair of electrodes 3, 3' were obtained by twisting 19 pieces of tin-plated copper wires having a diameter of 0.08 mm and by heat-sealing at a predetermined position of the non-woven fabric. The polymer resistor 4 was similarly formed by heat-sealing so as not to be in direct contact with the electrodes 3, 3', and thereafter, the conductive layers 5, 5' for allowing the polymer resistor 4 to be in contact with the electrodes 3, 3' were heat-sealed, thereby obtaining a polymer heating element 1. It is noted that lead wires for supplying electricity to the electrodes 3, 3' are omitted.

At this time, the polymer resistor 4 which was processed by a method similar to that of Embodiment 1 was used.

The conductive layers 5, 5' were obtained as follows: as a resin component, 21% by weight of an ethylene/vinyl acetate copolymer (brand name of "Evaflex EV150," produced by DuPont-Mitsui Polychemicals Co., Ltd.), and 9% by weight of a resin which contains a functional group responsible for metal affinity (brand name of "Tough-Tek M1943" (a modified type of hydrogenated styrene-based thermoplastic elastomer), produced by Asahi Kasei Corporation), were kneaded with, as a conductor, 30% by weight of a conductive whisker (brand name of "FTL-110," needle-like titanium oxide, produced by Ishihara Sangyo Kaisha, Ltd.), 30% by weight of a carbon black (brand name of "Furnace Black #10B," particle size 84 nm, produced by Mitsubishi Chemical Corporation), and 10% by weight of a flame retardant (brand name of "Reophos RDP," a phosphate ester-based liquid flame retardant, produced by Ajinomoto Co., Inc.), thereby obtaining a kneaded substance and forming a film with a thickness of 100 μm. The specific electrical resistance was 6 Ω·cm.

In the present embodiment, the polymer resistor 4 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element.

The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 2 and, also, a flame retardant is blended into the polymer resistor 4 and conductive layers 5, 5', thus making it possible to realize flame retardance.

It was confirmed that the flame retardance is required to meet the FMVSS 302 standard for flame retardance of vehicle interior materials, as a single component of a polymer heating element (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element obtained in the present embodiment was subjected to a shelf test in a furnace at 80° C., a shelf test in a furnace at 150° C. and a heat cycle test at −20° C. and 50° C.

As a result, after the respective tests for 500 hours, 200 hours and at 200 times, the change ratios in resistance values were all within 30% of the initial value.

This was considered due to the fact that a cross-linking reaction resulting from a reactive resin allowed bonding of a crystalline resin itself and bonding of the crystalline resin with a conductor.

In addition, in the present embodiment, the polymer resistor 4 and the electrodes 3, 3' were shown in such an arrangement that they were not superimposed on the same plane.

However, as long as they are in contact via the conductive layers 5, 5', a stacked arrangement is also acceptable.

(Embodiment 3)

A polymer heating element used in Embodiment 3 of the present invention was similar in structure to that used in Embodiment 1.

For example, the electrically insulating base substrate 2 was prepared with a polyester fiber and subjected to fine embossing. A flame retardant-impregnated non-woven fabric is usable.

The pair of electrodes 3, 3' were obtained by forming in parallel 19 pieces of 3% silver-containing silver-copper alloy wires having a diameter of 0.06 mm and by heat-sealing at a predetermined position of the non-woven fabric. The polymer resistor 4 was similarly formed by heat-sealing so as not to be in direct contact with the electrodes 3, 3', and thereafter, the conductive layers 5, 5' for allowing the polymer resistor 4 to be in contact with the electrodes 3, 3' were heat-sealed, thereby obtaining a polymer heating element 1. It is noted that lead wires for supplying electricity to the electrodes 3, 3' are omitted.

At this time, the polymer resistor 4 which was processed by a method similar to that of Embodiment 1 was used.

The conductive layers 5, 5' used were similar to those of Embodiment 1.

In the present embodiment, the polymer resistor 4 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch. Further, as a planar heating element having PTC characteristics, instant heat generation and energy saving performance can be exhibited, as compared with a car seat heater adopting a conventional tubing heater as a heating element.

The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 2 and, also, a flame retardant is blended into the polymer resistor 4 and conductive layers 5, 5', thus making it possible to realize flame retardance.

It was confirmed that the flame retardance is required to meet the FMVSS 302 standard for flame retardance of vehicle interior materials, as a single component of a polymer heating element (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element obtained in the present embodiment was subjected to a shelf test in a furnace at 80° C., a shelf test in a furnace at 150° C. and a heat cycle test at −20° C. and 50° C.

As a result, after the respective tests for 500 hours, 200 hours and at 200 times, the change ratios in resistance values were all within 30% of the initial value.

This was considered due to the fact that a cross-linking reaction resulting from a reactive resin allowed bonding of a crystalline resin itself and bonding of the crystalline resin with a conductor.

In addition, in the present embodiment, the polymer resistor 4 and the electrodes 3, 3' were shown in such an arrangement that they were not superimposed on the same plane. However, as long as they are in contact via the conductive layers 5, 5', a stacked arrangement is also acceptable (Embodiment 4)

A polymer heating element used in Embodiment 4 of the present invention was similar in structure to that used in Embodiment 1 shown in FIGS. 1 and 2.

The polymer resistor 4 was used in which a kneaded substance is prepared with the following materials in accordance with the following procedures, and thereafter processed into a film form by calendering.

That is, the polymer resistor 4 consisted of as a crystalline resin, 30 parts of an ethylene/methyl methacrylate copolymer (brand name of "Acryft CM5021," melting point of 67° C., produced by Sumitomo Chemical Co., Ltd.), 30 parts of an ethylene/methacrylic acid copolymer (brand name of "Nucrel N1560," melting point of 90° C., produced by DuPont-Mitsui Polychemicals Co., Ltd.), and 40 parts of an ethylene/methacrylic acid copolymer metal coordination compound (brand name of "Himilan 1702," melting point of 90° C., produced by DuPont-Mitsui Polychemicals Co., Ltd.).

35% by weight of this crystalline resin, 2% by weight of a reactive resin (brand name "Bondfast 7BJ," produced by Sumitomo Chemical Co., Ltd.), as two types of conductors, 25% by weight of a carbon black (brand name of "Printex L," primary particle size of 21 nm, produced by Degussa AG), and 18% by weight of a graphite (brand name of "GR15," scaled graphite, produced by Nippon Graphite Industries Ltd.), and 20% by weight of a flame retardant (brand name of "Reophos RDP," a phosphate ester-based liquid flame retardant, produced by Ajinomoto Co., Inc.), were used to prepare a kneaded substance A.

Next, as an elastomer, 40% by weight of a styrene-based thermoplastic elastomer (brand name of "Tough-Tek M1943," produced by Asahi Kasei Engineering Corporation), 45% by weight of a carbon black (brand name "#10B," primary particle size of 75 nm, produced by Mitsubishi Chemical Corporation), 13% by weight of a tungsten carbide (produced by Izawa Metal Co., Ltd.), as a melt tension improver, 2% by weight of a mixture of an alkyl methacrylate/alkyl acrylate copolymer and a tetra-fluoroethylene copolymer (brand name of "Metablen A3000," produced by Mitsubishi Rayon Co., Ltd.), were used to prepare a kneaded substance B.

Then, the kneaded substance A and kneaded substance B in an equal quantity were kneaded with, as a release agent, 2% by weight of a modified silicone oil, and as a fluidity-imparting agent, 2% by weight of an alkyl methacrylate/alkyl acrylate copolymer to prepare a polymer resistor 4.

The conductive layers 5, 5' were obtained as follows: as a resin component, 21% by weight of an ethylene/vinyl acetate copolymer (brand name of "Evaflex EV 150," produced by DuPont-Mitsui Polychemicals Co., Ltd.), and, as a functional group responsible for metal affinity, 10% by weight of a maleic anhydride-containing resin (brand name of "Bondine LX4110," an ethylene/acrylic ester/maleic anhydride ternary copolymer resin, produced by Sumitomo Chemical Co., Ltd.) were kneaded with, as a conductor, 40% by weight of a conductive whisker (brand name of "FTL-110," needle-like titanium oxide, produced by Ishihara Sangyo Kaisha, Ltd.), 15% by weight of a carbon black (brand name of "Printex L," primary particle size of 21 nm, produced by Degussa AG), 10% by weight of a flame retardant (brand name of "Reophos RDP," a phosphate ester-based liquid flame retardant, produced by Ajinomoto Co., Inc.), and 4% by weight of a reactive additive agent (brand name of "Perhexa 25B-40," 2,5-dimethyl-2,5-di(t-butyl peroxy)hexane, produced by NOF Corporation), thereby obtaining a kneaded substance and forming a film with a thickness of 100 μm. The specific electrical resistance was 5 Ω·cm.

The polymer heating element 1 which forms the planar heating element is, as shown in FIGS. 3 and 4, used as a heat source for warming purposes by being attached to a seat portion 7 and a seat back rest 8 of seat devices 6 of an automobile, with the base substrate 2 being given as an upper part.

In order to respond to upholstered portions (not illustrated) of the seat portion 7 and the seat back rest 8, an ear portion (extended portion of the base substrate 2) is provided for upholstering them into a central portion and a peripheral border portion, which is, however, omitted here.

Further, the seat portion 7 and the seat back rest 8 on which the above-described polymer heating element 1 has been loaded are provided with a seat base substrate 9 and a seat cover 10 such as a urethane pad which is in general deformed when a load is applied by a person sitting on a seat and restored when a load is no longer applied. Therefore, the polymer heating element 1 which is a thin planar heating element attached by forming the polymer resistor 4 on the seat base substrate 9 of the seat portion 7 and the seat back rest 8, with the base substrate 2 formed on the seat cover 10, is also required to undergo similar deformation corresponding to the deformation of the seat portion 7 and the seat back rest 8.

Therefore, the design of various heat generating patterns and a configuration of forming the electrodes 3, 3' and the conductive layers 5, 5' are, as a matter of course, required to be changed, which are, however, omitted here.

The electrodes 3, 3' which are a wide pair (electrically positive and negative sides) are formed so as to oppose each other along the outside in the longitudinal direction of the polymer heating element 1. Electric currents flow through the polymer resistor 4 via the conductive layers 5, 5' formed so as to be in contact therewith, thereby generating heat.

In the present embodiment, the polymer resistor 4 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device 6 of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element.

The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material 10. However, a polymer heating element 1 of the present embodiment is self-controlled for a heat-generating temperature in a range of 40° C. to 50° C. and, therefore, can be formed in proximity to the seat cover material 10. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 2 and, also, a flame retardant is blended into the polymer resistor 4 and conductive layers 5, 5', thus making it possible to realize flame retardance.

It was confirmed that the flame retardance is required to meet the FMVSS 302 standard for flame retardance of vehicle interior materials, as a single component of a polymer heating element 1 (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element 1 obtained in the present embodiment was subjected to a shelf test in a furnace at 80° C., a shelf test in a furnace at 150° C. and a heat cycle test at −20° C. and 50° C.

As a result, after the respective tests for 500 hours, 200 hours and at 200 times, the change ratios in resistance values were all within 30% of the initial value.

This was considered due to the fact that a cross-linking reaction resulting from a reactive resin allowed bonding of a crystalline resin itself and bonding of the crystalline resin with a conductor.

In order to exhibit excellent PTC characteristics, a plurality of conductors are combined and a sea island structure is provided in the present embodiment.

The details of the mechanism remain unknown at the present time, which are, however, estimated as follows.

First, in order to provide a resistor composition having PTC characteristics, it is necessary to select a crystalline resin to be used from those whose melting point is in the vicinity of a saturated heat generation temperature or more.

A conductor is required to attain a predetermined resistance value in an added quantity as little as possible. The conductor of this type is in general called conductive carbon black in which the primary particle size is about 20 nm or less and the structure is developed (which is an aggregate of primary particles like a bunch of grapes and correlated with an oil absorption). The above-described conductive carbon black is, on the other hand, disadvantageous in difficultly developing PTC characteristics.

This is said to be due to the fact that in the conductive carbon black, a structure is developed and a conductive path of the structure is not likely to be disconnected even by a change in specific volume due to the temperature of a crystalline resin (which is said to be mainly responsible for developing PTC characteristics).

On the other hand, the inventor and others have found that a carbon black greater in primary particle size has excellent PTC characteristics.

The inventor and others have also found that conductors such as graphite are greater in particle size than carbon black and provided with a scale-like layer structure and also conductors such as metals and ceramics are great in particle size and provided with amorphous excellent electrical conductivity (small in specific volume resistance (1/100 or less than carbon- and graphite-based conductors)). By combining a plurality of these conductors, a resistor composition can be provided in which the thickness is about 100 micrometers or less, the area resistance is 400 Ω/□ or less, the specific electrical resistance is 3 Ω·cm or less, and, in terms of the change ratio of resistance value with respect to a temperature which is one index of PTC characteristics, a ratio of resistance value at 50° C. to a resistance value at 20° C. is 1.5 or more and a ratio of resistance value at 80° C. to a resistance value at 20° C. is 5 or more.

Details of a mechanism capable of exhibiting excellent PTC characteristics although low in resistance remain unknown. It is, however, considered that this is because a new conductive path can be formed by combining a crystalline resin with a plurality of conductors and a great thermal expansion coefficient of liquid can be used by providing a liquid flame retardant.

Still further, the conductor used was in a whisker shape. A spherical shape or other bur-like shapes are also acceptable.

In addition, in the present embodiment, the polymer resistor 4 and the electrodes 3, 3' were shown in such an arrangement that they were not superimposed on the same plane. However, as long as they are in contact via the conductive layers 5, 5', a stacked arrangement is also acceptable.

(Embodiment 5)

A polymer heating element used in Embodiment 5 of the present invention was similar in structure to that used in Embodiment 4.

For example, the electrically insulating base substrate 2 was prepared with a polyester fiber and subjected to fine embossing. A flame retardant-impregnated non-woven fabric is usable.

The pair of electrodes 3, 3' were obtained by twisting 19 pieces of tin-plated copper wires having a diameter of 0.08 mm and by heat-sealing at a predetermined position of the non-woven fabric.

The polymer resistor 4 was similarly formed by heat-sealing so as not to be in direct contact with the electrodes 3, 3', and thereafter, the conductive layers 5, 5' for allowing the polymer resistor 4 to be in contact with the electrodes 3, 3' were heat-sealed, thereby obtaining a polymer heating element 1. It is noted that lead wires for supplying electricity to the electrodes 3, 3' are omitted.

At this time, the polymer resistor 4 which was processed by a method similar to that of Embodiment 4 was used.

The conductive layers 5, 5' were obtained as follows: as a resin component, 21% by weight of an ethylene/vinyl acetate copolymer (brand name of "Evaflex EV 150," produced by DuPont-Mitsui Polychemicals Co., Ltd.), and 9% by weight of a resin which contains a functional group responsible for metal affinity (brand name of "Tough-Tek M1943," a modified type of hydrogenated styrene-based thermoplastic elastomer, produced by Asahi Kasei Engineering Corporation) were kneaded with, as a conductor, 30% by weight of a conductive whisker (brand name of "FTL-110," needle-like titanium oxide, produced by Ishihara Sangyo Kaisha, Ltd.), 25% by weight of a carbon black (brand name of "Furnace Black #10B," particle size of 84 nm, produced by Mitsubishi Chemical Corporation), 10% by weight of a flame retardant (brand name of "Reophos RDP," a phosphate ester-based liquid flame retardant, produced by Ajinomoto Co., Inc.), and 5% by weight of a reactive additive agent (brand name of "Plain Act KR44"), a titanate-based coupling agent, produced by Ajinomoto Fine-Techno Co., Inc.), thereby obtaining a kneaded substance and forming a film with a thickness of 100 μm. The specific electrical resistance was 6 Ω·cm.

In the present embodiment, the polymer resistor 4 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element.

The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element 1 of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 2 and, also, a flame retardant is blended into the polymer resistor 4 and conductive layers 5, 5', thus making it possible to realize flame retardance.

It was confirmed that the flame retardance is required to meet the FMVSS 302 standard for flame retardance of vehicle interior materials, as a single component of a polymer heating element 1 (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element 1 obtained in the present embodiment was subjected to a shelf test in a furnace at 80° C., a shelf test in a furnace at 150° C. and a heat cycle test at −20° C. and 50° C.

As a result, after the respective tests for 500 hours, 200 hours and at 200 times, the change ratios in resistance values were all within 30% of the initial value.

This was considered due to the fact that a cross-linking reaction resulting from a reactive resin allowed bonding of a crystalline resin itself and bonding of the crystalline resin with a conductor.

In addition, in the present embodiment, the polymer resistor 4 and the electrodes 3, 3' were shown in such an arrangement that they were not superimposed on the same plane. However, as long as they are in contact via the conductive layers 5, 5', a stacked arrangement is also acceptable.

(Embodiment 6)

A polymer heating element used in Embodiment 6 of the present invention was similar in structure to that used in Embodiment 4.

For example, the electrically insulating base substrate 2 was prepared with a polyester fiber and subjected to fine embossing. A flame retardant-impregnated non-woven fabric is usable.

The pair of electrodes 3, 3' were obtained by twisting 19 pieces of tin-plated copper wires having a diameter of 0.08 mm and by heat-sealing at a predetermined position of the non-woven fabric.

The polymer resistor 4 was similarly formed by heat-sealing so as not to be in direct contact with the electrodes 3, 3', and thereafter, the conductive layers 5, 5' for allowing the polymer resistor 4 to be in contact with the electrodes 3, 3' were heat-sealed, thereby obtaining a polymer heating element 1. It is noted that lead wires for supplying electricity to the electrodes 3, 3' are omitted.

At this time, the polymer resistor 4 which was processed by a method similar to that of Embodiment 4 was used.

The conductive layers 5, 5' were obtained as follows: as a resin component, 17% by weight of an ethylene/methacrylate copolymer (brand name of "CG4002," produced by Sumitomo Chemical Co., Ltd.), and 7% by weight of an ethylene-based copolymer (brand name of "Acryft WH206," (an ethylene/methyl methacrylate copolymer), produced by Sumitomo Mitsui Chemical Co., Ltd.), were kneaded with, as a conductor, 40% by weight of a conductive whisker (brand name of "FTL-110," needle-like titanium oxide, produced by Ishihara Sangyo Kaisha, Ltd.), 12% by weight of a carbon black (brand name of "Furnace Black #10B," particle size of 84 nm, produced by Mitsubishi Chemical Corporation), 12% by weight of a carbon black (brand name of "Printex L," primary particle size of 21 nm, produced by Degussa AG), 10% by weight of a flame retardant (brand name of "Reophos RDP," a phosphate ester-based liquid flame retardant, produced by Ajinomoto Co., Inc.), a reactive additive agent (brand name of "Plain Act KR44"), 2% by weight of a titanate-based coupling agent, produced by Ajinomoto Fine-Techno Co., Inc.) and a melt tension improver, (brand name of "Metablen A3000," produced by Mitsubishi Rayon Co., Ltd.), thereby obtaining a kneaded substance and forming a film with a thickness of 100 µm. The specific electrical resistance was 6 Ω·cm.

In the present embodiment, the polymer resistor 4 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element.

The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element 1 of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 2 and, also, a flame retardant is blended into the polymer resistor 4 and conductive layers 5, 5', thus making it possible to realize flame retardance.

It was confirmed that the flame retardance is required to meet the FMVSS 302 standard for flame retardance of vehicle interior materials, as a single component of a polymer heating element 1 (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element 1 obtained in the present embodiment was subjected to a shelf test in a furnace at 80° C., a shelf test in a furnace at 150° C. and a heat cycle test at −20° C. and 50° C. As a result, after the respective tests for 500 hours, 200 hours and at 200 times, the change ratios in resistance values were all within 30% of the initial value.

This was considered due to the fact that a cross-linking reaction resulting from a reactive resin allowed bonding of a crystalline resin itself and bonding of the crystalline resin with a conductor.

In addition, in the present embodiment, the polymer resistor 4 and the electrodes 3, 3' were shown in such an arrangement that they were not superimposed on the same plane. However, as long as they are in contact via the conductive layers 5, 5', a stacked arrangement is also acceptable.

(Embodiment 7)

Figure 5A:
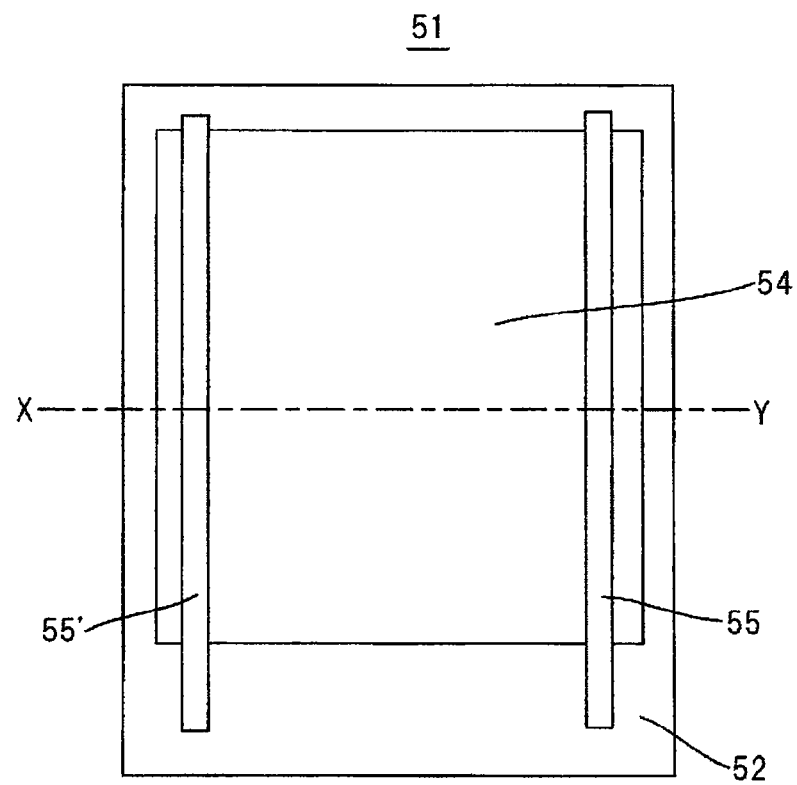
FIG. 5($a$) is a plan view showing a polymer heating element according to Embodiment 7 of the present invention, FIG. 5($b$) is a cross-sectional view of the polymer heating element, and FIG. 5($c$) is an enlarged view of the polymer heating element.
Figure 5B:
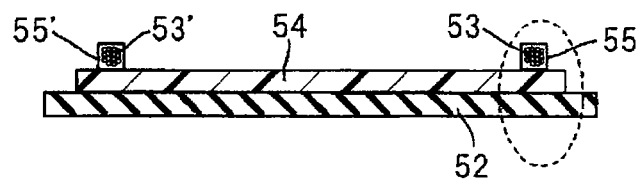
Figure 5C:
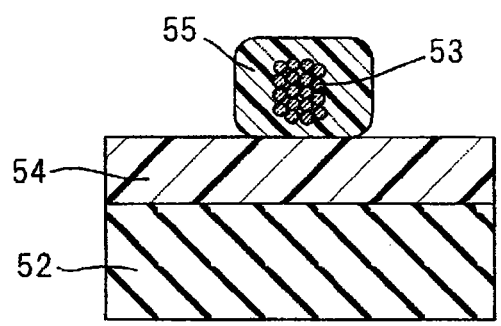

FIG. 5 are schematic pattern diagrams showing the polymer heating element according to Embodiment 7 of the present invention. FIG. 5(a) is a plan view, FIG. 5(b) is a cross-sectional view taken along line X-Y in FIG. 5(a) and FIG. 5(c) is an enlarged view of an electrode and a conductive portion encircled with the broken line in FIG. 5(b). In FIGS. 5, a heating element 51 is configured as follows. The polymer heating element 51 includes a pair of electrodes 53, 53', a polymer resistor 54 and conductive layers 55, 55' on an electrically insulating base substrate 52.

For example, the electrically insulating base substrate 52 is a needle-punched type prepared with polyester fibers. A flame retardant-impregnated non-woven fabric is usable. The polymer resistor 54 was formed by heat-sealing. Thereafter, the electrodes 53, 53' were coated in advance with the conductive layers 55, 55', and the conductive layer 55, 55' were heat-sealed so that the electrodes 53, 53' were not in direct contact with the polymer resistor 54, thereby obtaining the polymer heating element 51. At this time, the electrodes 53, 53' were obtained by twisting 19 pieces of tin-plated copper wires with a diameter of 0.06 mm. It is noted that lead wires for supplying electricity to the electrodes 53, 53' were omitted.

At this time, the polymer resistor 54 was used in which a kneaded substance is prepared with the following materials in accordance with the following procedures, and thereafter processed into a film form by calendering.

That is, the polymer resistor 54 consisted of as a crystalline resin, 30 parts of an ethylene/methyl methacrylate copolymer (brand name of "Acryft CM5021," melting point of 67° C., produced by Sumitomo Chemical Co., Ltd.), 30 parts of an ethylene/methacrylic acid copolymer (brand name of "Nucrel N1560," melting point of 90° C., produced by DuPont-Mitsui Polychemicals Co., Ltd.), and 40 parts of an ethylene/methacrylic acid copolymer metal coordination compound (brand name of "Himilan 1702," melting point of 90° C., produced by DuPont-Mitsui Polychemicals Co., Ltd.) 40 parts.

35% by weight of this crystalline resin, 2% by weight of a reactive resin (brand name "Bondfast 7BJ," produced by Sumitomo Chemical Co., Ltd.), as two types of conductors, that is, 25% by weight of a carbon black (brand name of "Printex L," primary particle size of 21 nm, produced by Degussa AG), and 18% by weight of a graphite (brand name of "GR15," scaled graphite, produced by Nippon Graphite Industries Ltd.), and 20% by weight of a flame retardant (brand name of "Reophos RDP," a phosphate ester-based liquid flame retardant, produced by Ajinomoto Co., Inc.), were used to prepare a kneaded substance A.

Next, as an elastomer, 40% by weight of a styrene-based thermoplastic elastomer (brand name of "Tough-Tek M1943," produced by Asahi Kasei Engineering Corporation), 45% by weight of a carbon black (brand name "#10B," primary particle size of 75 nm, produced by Mitsubishi Chemical Corporation), 13% by weight of a tungsten carbide (produced by Izawa Metal Co., Ltd.), as a melt tension improver, 2% by weight of a mixture of an alkyl methacrylate/alkyl acrylate copolymer and a tetra-fluoroethylene copolymer (brand name of "Metablen A3000," produced by Mitsubishi Rayon Co., Ltd.), were used to prepare a kneaded substance B.

Then, the kneaded substance A and kneaded substance B in an equal quantity were kneaded with, as a release agent, 2% by weight of a modified silicone oil, and as a fluidity-imparting agent, 2% by weight of an alkyl methacrylate/alkyl acrylate copolymer to prepare a polymer resistor 54.

The conductive layers 55, 55' were obtained as follows: as a resin component, 17% by weight of an ethylene/methacrylic acid copolymer (brand name of "CG4002," produced by Sumitomo Chemical Co., Ltd.) and 7% by weight of an ethylene-based copolymer (brand name of "Acryft WH206," (ethylene/methyl methacrylate copolymer), produced by Sumitomo Mitsui Chemical Co., Ltd.) were kneaded with, as a conductor, 38% by weight of a conductive whisker (brand name of "FTL-110," needle-like titanium oxide, produced by Ishihara Sangyo Kaisha, Ltd.), 12% by weight of a carbon black (brand name of "Furnace Black #10B," particle size of 84 nm, produced by Mitsubishi Chemical Corporation), 12% by weight of a carbon black (brand name of "Printex L," primary particle size of 21 nm, produced by Degussa AG), 10% by weight of a flame retardant (brand name of "Reophos RDP," a phosphate ester-based liquid flame retardant, produced by Ajinomoto Co., Inc.), 2% by weight of a reactive additive agent (brand name of "Plain Act KR44"), a titanate-based coupling agent, produced by Ajinomoto Fine-Techno Co., Inc.) and 2% by weight of a melt tension improver, (brand name of "Metablen A3000," produced by Mitsubishi Rayon Co., Ltd.), thereby obtaining a kneaded substance. The resultant was subjected to co-extrusion together with a substance obtained by twisting 19 pieces of thin metal wires (0.05 mm in diameter) made of tin-plated copper to give electrodes 53, 53', thus obtaining a conductive coated electrode in which an electrode portion was integrated with a conductive layer portion.

At this time, the conductive layer was 1 Ω·cm in specific electrical resistance. In terms of PTC characteristics, a ratio of resistance value at 80° C. to a resistance value at 20° C. was 1.8, and a ratio of a resistance value of the polymer resistor to resistance value of the conductive layer at 80° C. was 2.0.

The polymer heating element 51 which forms the planar heating element is, as shown in FIGS. 3 and 4, used for example by being attached to a seat portion 7 and a seat back rest 8 of the seat device 6 of an automobile, with the base substrate 52 being given as an upper part, as a heating element for warming purposes.

In order to respond to upholstered portions (not illustrated) of the seat portion 7 and the seat back rest 8, an ear portion (extended portion of the base substrate 52) is provided for upholstering them into a central portion and a peripheral border portion, which is, however, omitted here.

Further, the seat portion 7 and the seat back rest 8 on which the above-described polymer heating element 51 has been loaded are provided with a seat base substrate 9 and a seat cover 10 such as a urethane pad which is in general deformed when a load is applied by a person sitting on a seat and restored when a load is no longer applied. Therefore, the polymer heating element 51 which is a thin planar heating element attached by forming the polymer resistor 54 on the seat base substrate 9 of the seat portion 7 and the seat back rest 8, with the base substrate 52 formed on the seat cover 10, is also required to undergo similar deformation corresponding to the deformation of the seat portion 7 and the seat back rest 8.

Therefore, the design of various heat generating patterns and a configuration of forming the electrodes 53, 53' and the conductive layers 55, 55' are, as a matter of course, required to be changed, which are, however, omitted here.

The electrodes 53, 53' which are a wide pair (electrically positive and negative sides) are formed so as to oppose each other along the outside in the longitudinal direction of the polymer heating element 51. Electric currents flow through the polymer resistor 54 via the conductive layers 55, 55' formed so as to be in contact therewith, thereby generating heat.

In the present embodiment, the polymer resistor 54 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device 6 of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element. The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 52 and, also, a flame retardant is blended into the polymer resistor 54 and conductive layers 55, 55', thus making it possible to realize flame retardance.

It was confirmed that the flame retardance is required to meet the FMVSS 302 standard for flame retardance of vehicle interior materials, as a single component of a polymer heating element (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element obtained in the present embodiment was subjected to a shelf test in a furnace at 80° C., a shelf test in a furnace at 150° C. and a heat cycle test at −20° C. and 50° C. As a result, after the respective tests for 500 hours, 200 hours and at 200 times, the change ratios in resistance values were all within 30% of the initial value. This was considered due to the fact that a cross-linking reaction resulting from a reactive resin allowed bonding of a crystalline resin itself and bonding of the crystalline resin with a conductor. The details of the mechanism remain unknown at the present time, which are, however, estimated as follows.

First, in order to provide a resistor composition having PTC characteristics, it is necessary to select a crystalline resin to be used from those whose melting point is in the vicinity of a saturated heat generation temperature or more.

A conductor is required to attain a predetermined resistance value in an added quantity as little as possible. The conductor of this type is in general called conductive carbon black in which the primary particle size is about 20 nm or less and the structure is developed (which is an aggregate of primary particles like a bunch of grapes and correlated with an oil absorption). The above-described conductive carbon black is, on the other hand, disadvantageous in difficultly developing PTC characteristics.

This is said to be due to the fact that in the conductive carbon black, a structure is developed and a conductive path of the structure is not likely to be disconnected even by a change in specific volume due to the temperature of a crystalline resin (which is said to be mainly responsible for developing PTC characteristics).

On the other hand, the inventor and others have found that a carbon black greater in primary particle size has excellent PTC characteristics.

The inventor and others have also found that conductors such as graphite are greater in particle size than carbon black and provided with a scale-like layer structure and also conductors such as metals and ceramics are great in particle size and provided with amorphous excellent electrical conductivity (small in specific volume resistance (1/100 or less than carbon- and graphite-based conductors)). By combining a plurality of these conductors, a resistor composition can be provided in which the thickness is about 100 micrometers or less, the area resistance is 400 Ω/□ or less, the specific electrical resistance is 3 Ω·cm or less, and, in terms of the change ratio of resistance value with respect to a temperature which is one index of PTC characteristics, a ratio of resistance value at 50° C. to a resistance value at 20° C. is 1.5 or more and a ratio of resistance value at 80° C. to a resistance value at 20° C. is 5 or more.

Details of a mechanism capable of exhibiting excellent PTC characteristics although low in resistance remain unknown. It is, however, considered that this is because a new conductive path can be formed by combining a crystalline resin with a plurality of conductors and a great thermal expansion coefficient of liquid can be used by providing a liquid flame retardant.

Still further, the conductor used was in a whisker shape. A spherical shape or other bur-like shapes are also acceptable.

Still further, in the present embodiment, on the polymer resistor 54, the electrodes 53, 53' were formed via the conductive layers 55, 55'. However, if there is available such a mode as to be in contact via a conductive layer, any arrangement is acceptable.

(Embodiment 8)

Figure 6A:
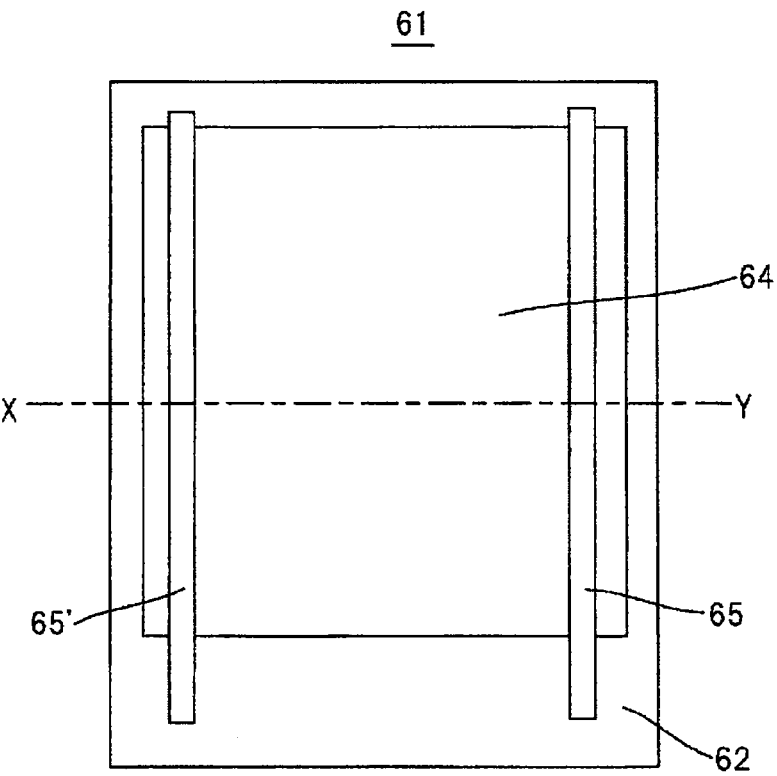
FIG. 6($a$) is a plan view of a polymer heating element according to Embodiment 8 of the present invention, FIG. 6($b$) is a cross-sectional view of the polymer heating element according to the above and FIG. 6($c$) is an enlarged view of the polymer heating element according to the above.
Figure 6B:
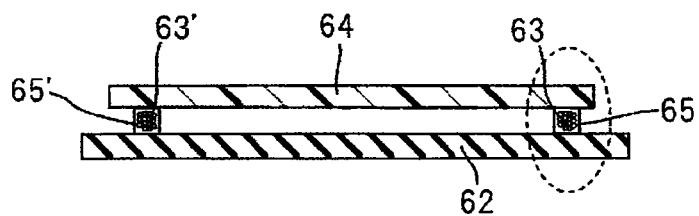
Figure 6C:
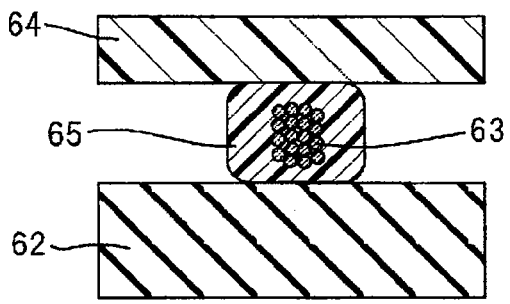
Figure 7:
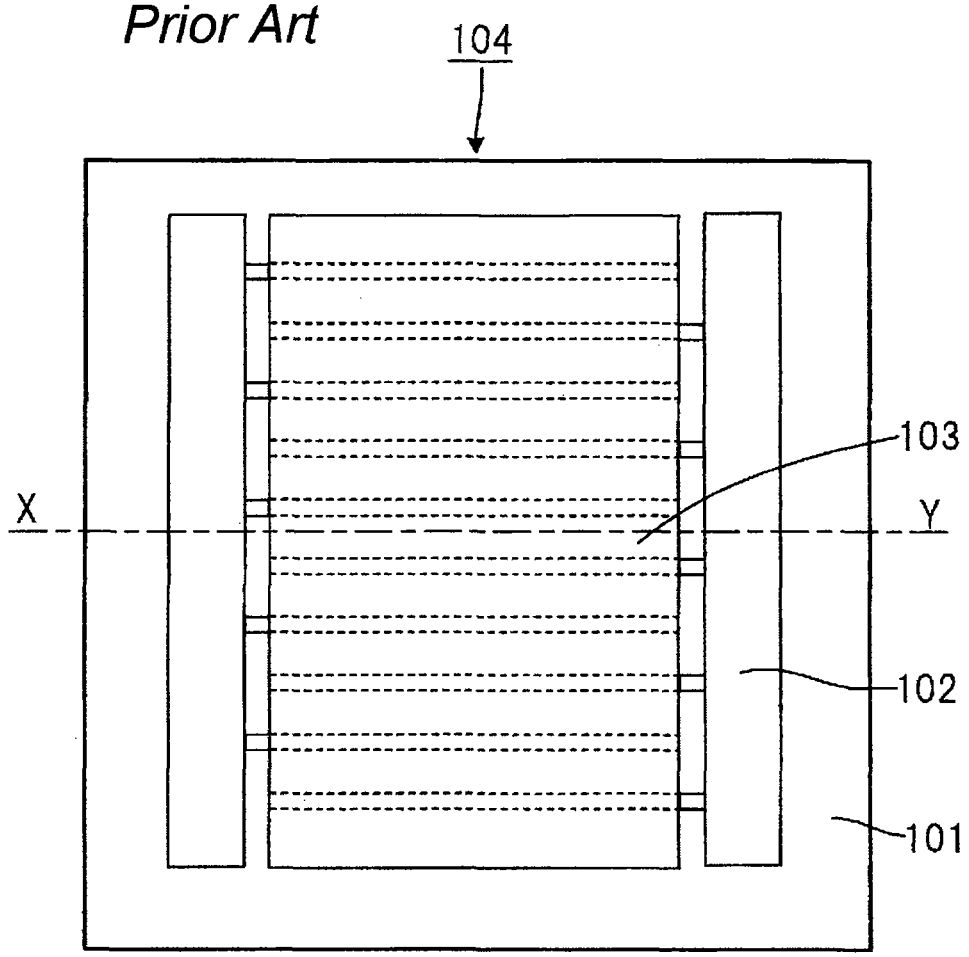
FIG. 7 is a plan view showing a conventional heating element.
Figure 8:
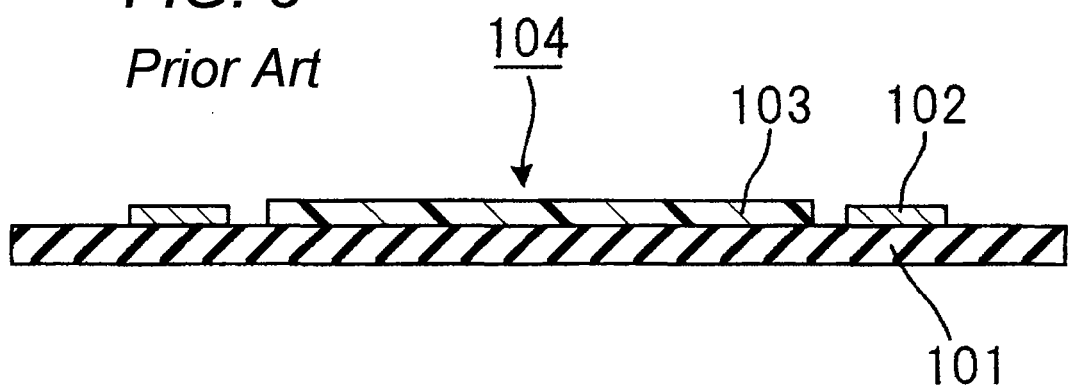
FIG. 8 is a cross-sectional view taken along line X-Y in FIG. 7.

FIG. 6 are schematic pattern diagrams showing the polymer heating element according to Embodiment 8 of the present invention. FIG. 6(*a*) is a plan view, FIG. 6(*b*) is a cross-sectional view taken along line X-Y in FIG. 6(*a*) and FIG. 6(*c*) is an enlarged view of an electrode and a conductive portion encircled with the broken line in FIG. 6(*b*). In FIGS. 6, a heating element 61 is configured as follows. The polymer heating element 61 includes a pair of electrodes 63, 63', a polymer resistor 64 and conductive layers 65, 65' on an electrically insulating base substrate 62.

For example, the electrically insulating base substrate 62 is a needle-punched type and prepared with polyester fibers. A flame retardant-impregnated non-woven fabric is usable. The electrodes 63, 63' were in advance coated with the conductive layers 65, 65', and the conductive layers 65, 65' were heat-sealed at a predetermined spacing on the electrically insulating base substrate 62 in such a manner that the electrodes 63, 63' were not in direct contact with the polymer resistor 64, the polymer resistor 64 was formed thereon by heat-sealing, thereby obtaining the polymer heating element 61. At this time, the electrodes 63, 63' were obtained by twisting 19 pieces of silver-copper alloy wires with a diameter of 0.06 mm. It is noted that lead wires for supplying electricity to the electrodes 63, 63' were omitted. Further, in FIG. 6, the polymer resistor 64 was illustrated so as to be kept away from the electrically insulating base substrate 62. However, in reality, due to a sufficiently wide spacing between the electrodes 63, 63' (at least, 50 mm or more, and preferably, about 100 mm to about 200 mm) and small thickness of the conductive layers 65, 65' (at least 0.01 mm or more, preferably from about 0.1 to about 0.5 mm), heat-sealing can be attained sufficiently on an electrically insulating base substrate.

At this time, the polymer resistor 64 which was prepared by the same method as that in Embodiment 7 was used.

The conductive layers 65, 65' were obtained as follows: as a resin component, 21% by weight of an ethylene/vinyl acetate copolymer (brand name of "Evaflex EV150," produced by DuPont-Mitsui Polychemicals Co., Ltd.), and a resin which contains a functional group responsible for metal affinity (brand name of "Tough-Tek M1943," 9% by weight of a modified type of hydrogenated styrene-based thermoplastic elastomer, produced by Asahi Kasei Engineering Corporation) were kneaded with, as a conductor, 40% by weight of a conductive whisker (brand name of "FTL-110," needle-like titanium oxide, produced by Ishihara Sangyo Kaisha, Ltd.), 15% by weight of a carbon black (brand name of "Furnace Black #10B," particle size of 84 nm, produced by Mitsubishi Chemical Corporation), 10% by weight of a flame retardant (brand name of "Reophos RDP, a phosphate ester-based liquid flame retardant, produced by Ajinomoto Co., Inc.), and 5% by weight of a reactive additive agent (brand name of "Plain Act KR44"), a titanate-based coupling agent, produced by Ajinomoto Fine-Techno Co., Inc.), thereby obtaining a kneaded substance. The resultant was subjected to co-extrusion together with a substance obtained by twisting 19 pieces of thin metal wires (0.06 mm in diameter) made of silver-copper alloy to give electrodes 63, 63', thus obtaining a conductive coated electrode in which an electrode portion was integrated with a conductive layer portion.

At this time, the conductive layer was 2 Ω·cm in specific electrical resistance. In terms of PTC characteristics, a ratio of resistance value at 80° C. to a resistance value at 20° C. was 2.5, and a ratio of a resistance value of the polymer resistor to resistance value of the conductive layer at 80° C. was 1.5.

In the present embodiment, the polymer resistor 64 has PTC characteristics and is to have a self-temperature control function in such a manner that a resistance value increases with a rise in temperature to give a predetermined temperature, thereby having functions as a planar heating element without requiring temperature control and higher in safety.

Further, as a car seat heater of the planar heating element which is assembled into the seat device of an automobile, the seating feeling and flame retardance can be satisfied.

The seating feeling can be met by being free from a noise-making feeling as found in paper and having stretching characteristics similar to those of a seat cover material, that is, a load of 7 kgf or less with respect to 5% stretch.

Further, as a planar heating element having PTC characteristics, instant heat generation and energy saving performance can be exhibited, as compared with a car seat heater adopting a conventional tubing heater as a heating element. The car seat heater adopting a tubing heater as a heating element needs a temperature controller and controls energization by ON/OFF control to control a heat-generating temperature.

Since at the time of ON, heating wires increase in temperature up to about 80° C., such an arrangement is required so as to keep a certain distance away from a seat cover material. However, a polymer heating element of the present embodiment is self-controlled for a heat-generating temperature in a range of 40° C. to 50° C. and, therefore, can be formed in proximity to the seat cover material. The heat-generating temperature is low and the polymer heating element is formed at the proximity of the seat, thereby energy saving performance can be realized due to instant heat generation and being capable of reducing heat release loss to the outside.

Further, a flame-retardant non-woven fabric is used as the electrically insulating base substrate 62 and, also, a flame retardant is blended into the polymer resistor 64 and conductive layers 65, 65', thus making it possible to realize flame retardance.

It was confirmed that the flame retardance is required to meet the FMVSS 302 standard for flame retardance of vehicle interior materials, as a single component of a polymer heating element (a component not only with non-flammability on horizontal ignition but also automatic extinction and burning velocity between marked lines of 80 mm/min or less will conform to the standard) and any component will conform to the standard as long as a filled quantity of a flame retardant is at least 10% by weight or more.

The polymer heating element obtained in the present embodiment was subjected to a shelf test in a furnace at 80° C., a shelf test in a furnace at 150° C. and a heat cycle test at −20° C. and 50° C. As a result, after the respective tests for 500 hours, 200 hours and at 200 times, the change ratios in resistance values were all within 30% of the initial value. This was considered due to the fact that a cross-linking reaction resulting from a reactive resin allowed bonding of a crystalline resin itself and bonding of the crystalline resin with a conductor.

Further, in the present embodiment 8, under the polymer resistor 64, the electrodes 63, 63' were formed via the conductive layers 65, 65'. However, as long as they are in contact via a conductive layer, any arrangement is acceptable.

Still further, in the present embodiments 7 and 8, there was illustrated in such a manner that a protective layer on a resistor was omitted. With consideration given to water resistance and wear resistance, it is also acceptable that the protective layer thereon is provided.

It is noted that without departing from the spirit and scope of the present invention as well as on the basis of contents of the Description and known technology, the present invention is expected to be modified and applied in various ways by those skilled in the art. These modifications and applications are also included in the scope to be protected.

The application concerned is based on the Japanese Patent Application filed on Feb. 18, 2008 (Japanese Patent Application No. 2008-035583), the Japanese Patent Application filed on Oct. 16, 2008 (Japanese Patent Application No. 2008-267014) and the Japanese Patent Application filed on Dec. 12, 2008 (Japanese Patent Application No. 2008-316382), the contents of which are incorporated herein as references.

Industrial Applicability

As described above, a polymer heating element of the present invention is abundant in flexibility, high in reliability, and usable for heating seat devices, a steering wheel and other parts of an automobile as a heating element for warming purposes.

The invention claimed is:

1. A polymer heating element comprising:
   an electrically insulating base substrate;
   at least a pair of electrodes formed on the electrically insulating base substrate and made of a plurality of thin metal wires;
   a polymer resistor which is not in direct contact with, the pair of electrodes and which has PTC characteristics; and
   a conductive layer which is in contact with both the electrodes and the polymer resistor, wherein the conductive layer is formed above a spacing defined between the polymer resistor and each electrode of the pair of electrodes,
   wherein the conductive layer contains at least a resin component, a conductor component and an additive component.

2. The polymer heating element according to claim 1, wherein the resin component of the conductive layer has a functional group responsible for metal affinity.

3. The polymer heating element according to claim 1, wherein the additive component of the conductive layer contains at least one flame retardant selected from phosphorus, nitrogen and silicone-based flame retardants.

4. The polymer heating element according to claim 1, wherein the conductive layer is set to be 0.01 to 500 Ω·cm in specific electrical resistance.

5. The polymer heating element according to claim 1, wherein the conductor component of the conductive layer is contained from 50% by weight or more and 80% by weight or less with respect to the weight of the conductive layer in terms of weight percentage.

6. The polymer heating element according to claim 1, wherein the conductor component of the conductive layer contains a conductor selected from at least one of carbon black, graphite, carbon nanotube, carbon fiber, conductive ceramic fiber, conductive whisker, metal fiber, conductive inorganic oxide and conductive polymer fiber.

7. The polymer heating element according to claim 1, wherein the electrode is made of thin metal wires containing at least one of a tin plated copper, copper containing silver and silver-copper alloy.

8. The polymer heating element according to claim 1, wherein the electrically insulating base substrate is made of at least one of a resin film, fabric and non-woven fabric.

9. A seat device of an automobile on which the polymer heating element according to claim 1 is mounted.

10. A polymer heating element comprising:
    an electrically insulating base substrate;
    at least a pair of electrodes formed on the electrically insulating base substrate and made of a plurality of thin metal wires;
    a polymer resistor which is not in direct contact with the pair of electrodes and which has PTC characteristics; and
    a conductive layer which is in contact and abuts with and above both the electrodes and the polymer resistor,
    wherein the conductive layer contains at least a cross-linking resin component and a conductor component.

11. The polymer heating element according to claim 10, wherein the conductive layer contains the cross-linking resin component, the conductor component and a melt tension improver component.

12. The polymer heating element according to claim 10, wherein the cross-linking resin component of the conductive layer is cross-linked by a reactive additive agent.

13. The polymer heating element according to claim 10, wherein the conductor component of the conductive layer is contained from 50% by weight or more and 80% by weight or less with respect to the weight of the conductive layer in terms of weight percentage.

14. The polymer heating element according to claim 10, wherein the conductor component of the conductive layer contains a conductor selected from at least one of carbon black, graphite, carbon nanotube, carbon fiber, conductive ceramic fiber, conductive whisker, metal fiber, conductive inorganic oxide and conductive polymer fiber.

15. The polymer heating element according to claim 10, wherein the conductive layer is set to be 0.01 to 500 Ω·cm in specific electrical resistance.

16. The polymer heating element according to claim 10, wherein the electrode is made of thin metal wires containing at least one of a tin plated copper, copper containing silver and silver-copper alloy.

17. The polymer heating element according to claim 10, wherein the electrically insulating base substrate is made of at least one of a resin film, fabric and non-woven fabric.

18. A seat device of an automobile on which the polymer heating element according to claim 10 is mounted.

19. The polymer heating element according to claim 10, wherein the conductive layer is formed above a spacing defined between the polymer resistor and each electrode of the pair of electrodes.

20. A polymer heating element comprising:
    an electrically insulating base substrate;
    at least a pair of electrodes formed on the electrically insulating base substrate and made of a plurality of thin metal wires;
    a polymer resistor which is not in direct contact with the pair of electrodes and which has PTC characteristics; and
    a conductive layer which is in contact with both the electrodes and the polymer resistor, wherein the conductive layer is formed above the resistor layer and above the at least a pair of electrodes,
    wherein the conductive layer contains at least a resin component, a conductor component and an additive component.

* * * * *